2,862,018
O-ARYL O-LOWERALKYL N-ALKENYL PHOSPHOROAMIDOTHIOATES

Kenneth C. Kauer, Midland, Mich., assignor to The Dow Chemical Company, Midland, Mich., a corporation of Delaware No Drawing. Application July 30, 1956
Serial No. 600,673

5 Claims. (Cl. 260—461)

This invention is concerned with the O-aryl O-loweralkyl N-alkenyl phosphoroamidothioates having the formula

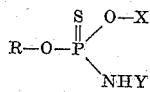

In this and the succeeding formulas, R represents a haloaryl radical, X represents a lower alkyl radical and Y represents allyl or methallyl. The term "lower alkyl" refers to the alkyl radicals containing from 1 to 4 carbon atoms, inclusive. These new compounds are viscous liquids somewhat soluble in many organic solvents and of very low solubility in water. They have been found to be active as parasiticides and are adapted to be employed as active toxic constituents of compositions for the control of mites and insect organisms such as aphids and flies.

The new compounds may be prepared by reacting an O-aryl O-loweralkyl phosphorochloridothioate of the formula

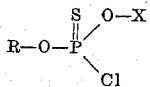

with allylamine or methallylamine. The reaction is carried out in the presence of an inert organic solvent such as acetone or methylene chloride. The reaction is somewhat exothermic and takes place smoothly at temperatures of from −10° to 30° C. with the formation of the desired product and amine hydrochloride of reaction. The temperature may be controlled by regulating the rate of contacting the reactants and by external cooling. Good results are obtained when employing at least two molecular proportions of the amine with each molecular proportion of the phosphorochloridothioate.

In carrying out the reaction, the amine is added portionwise to the phosphorochloridothioate dissolved in the reaction solvent. The addition is carried out with stirring and at a temperature of from 10° to 30° C. Upon completion of the reaction, the reaction mixture is washed with water or diluted with a water immiscible solvent and the solvent removed by evaporation or distillation under reduced pressure to obtain the desired product as a residue.

The following examples illustrate the invention but are not to be construed as limiting.

*Example 1.—O-(3,4-dichlorophenyl) O-methyl N-allyl phosphoroamidothioate*

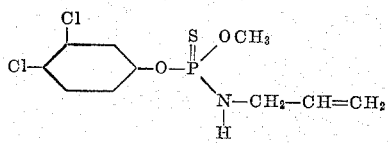

Allylamine (23 grams, 0.4 mole) was added portionwise with stirring to a solution of 55 grams (0.2 mole) of O-(3,4-dichlorophenyl) O-methyl phosphorochloridothioate in 100 milliliters of acetone. The addition was carried out in one hour and at a temperature of from 5° to 15° C. Following the addition, stirring was continued for 30 minutes. The reaction mixture was then washed with water and the washed product taken up in methylene chloride. Upon evaporation of the methylene chloride, there was obtained an O-(3,4-dichlorophenyl) O-methyl N-allyl phosphoroamidothioate product as a viscous brown liquid. This product had a refractive index $n/D$ of 1.5638 at 25° C. and a density of 1.324 at 25° C.

*Example 2.—O-(2,4,5-trichlorophenyl) O-methyl N-allyl phosphoroamidothioate*

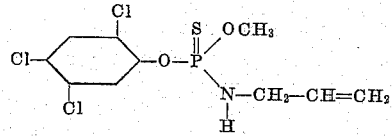

Allylamine (34 grams, 0.6 mole) was added portionwise with stirring to a solution of 98 grams (0.3 mole) of O-(2,4,5-trichlorophenyl) O-methyl phosphorochloridothioate in 200 milliliters of acetone. The addition was carried out in one hour and at a temperature of from 10° to 20° C. Following the addition, the reaction mixture was processed as described in Example 1 to obtain an O-(2,4,5-trichlorophenyl) O-methyl N-allyl phosphoroamidothioate product. This product was a viscous liquid having a chlorine content of 29.6 percent as compared to a calculated value of 30.7 percent.

*Example 3.—O-(2-bromo-4-tertiarybutylphenyl) O-methyl N-allyl phosphoroamidothioate*

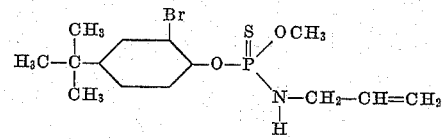

12.5 grams (0.22 mole) of allylamine was added portionwise with stirring to 42 grams (0.11 mole) of O-(2-bromo-4-tertiarybutylphenyl) O-methyl phosphorochloridothioate dissolved in 200 milliliters of acetone. The addition was carried out in one hour and at a temperature of from 5° to 15° C. The reaction mixture was then processed as previously described to obtain the desired product as a viscous, yellow liquid having a refractive index $n/D$ of 1.5509 at 25° C. and a density of 1.2885 at 25° C. This product contained 8.42 percent sulfur and 8.20 percent phosphorus compared to the calculated values of 8.45 percent and 8.20 percent respectively.

*Example 4.—O-(4-chlorophenyl) O-ethyl N-allyl phosphoroamidothioate*

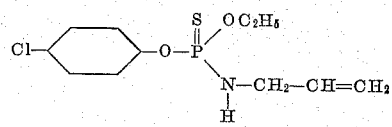

Allylamine (29 grams, 0.5 mole) was added portionwise with stirring to 59 grams (0.25 mole) of O-(4-chlorophenyl) O-ethyl phosphorochloridothioate dissolved in 100 milliliters of acetone. The allylamine was added over a period of one hour and at a temperature of from 0° to 7° C. Stirring was continued for 30 minutes after the addition. The reaction mixture was then processed as described in Example 1 to obtain an O-(4-chlorophenyl) O-ethyl N-allyl phosphoroamido thioate product as a brown viscous liquid having a refractive index $n/D$ of 1.5400 at 25° C., a chlorine content of 11.85 percent and a nitrogen content of 4.81 percent compared to the theoretical values of 12.2 percent chlorine and 4.80 percent nitrogen.

*Example 5.—O-(2,4,5-trichlorophenyl) O-methyl N-methallyl phosphoroamidothioate*

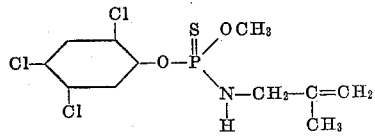

Methallylamine (0.5 mole) is added portionwise with stirring to 0.25 mole of O-(2,4,5-trichlorophenyl) O-methyl phosphorochloridothioate in 200 milliliters of acetone. The addition is carried out in one hour and at a temperature of from 10° to 25° C. Following the addition, stirring is continued for 0.5 hour to complete the reaction. The reaction mixture is then washed with water and thereafter processed as described in Example 1. As a result of these operations, there is obtained an O-(2,4,5-trichlorophenyl) O-methyl N-methallyl phosphoroamidothioate product having a molecular weight of 328.

In a similar manner other O-aryl O-loweralkyl N-alkenyl phosphoroamidothioates may be prepared as follows:

O-(2,4-dichlorophenyl) O-ethyl N-allyl phosphoroamidothioate by the reaction of allylamine with O-(2,4-dichlorophenyl) O-ethyl phosphorochloridothioate.

O-(2,4-dibromophenyl) O-n-butyl N-allyl phosphoroamidothioate by the reaction of allylamine with O-(2,4-dibromophenyl) O-n-butyl phosphorochloridothioate.

O-(2-methyl-4-chlorophenyl) O-methyl N-methallyl phosphoroamidothioate by the reaction of methallylamine with O-(2-methyl-4-chlorophenyl) O-methyl phosphorochloridothioate.

O-(4-bromophenyl) O-isopropyl N-methallyl phosphoroamidothioate by the reaction of methallylamine with O-(4-bromophenyl) O-isopropyl phosphorochloridothioate.

O-(2,4,5-trichlorophenyl) O-ethyl N-allyl phosphoroamidothioate by the reaction of allylamine with O-(2,4,5-trichlorophenyl) O-ethyl phosphorochloridothioate.

The new O-aryl O-loweralkyl N-alkenyl phosphoroamidothioates of the present invention are effective as parasiticides and are adapted to be employed for the control of numerous household and agricultural pests. For such use the products may be dispersed on a finely divided carrier and employed as dusts. The new products may also be employed in oils, as constituents in water emulsions or in water dispersions. In representative operations 100 percent controls of bean aphids and houseflies have been obtained with aqueous compositions containing 100 parts by weight of O-(2,4,5-trichlorophenyl) O-methyl N-allyl phosphoroamidothioate per million parts of ultimate mixture.

The O-aryl O-loweralkyl phosphorochloridothioates employed as starting materials may be prepared by the reaction at a temperature of from 20° to 90° C. of substantially equimolecular proportions of an alkali metal (preferably sodium) alcoholate and an O-aryl phosphorodichloridothioate. In carrying out the reaction, the alcoholate in the corresponding alcohol is added portionwise to the phosphorodichloridothioate dispersed in the same alcohol. This operation is carried out with stirring and at the reaction temperature. Upon completion of the reaction, the reaction mixture is washed with water to obtain the desired product as a liquid residue.

The preferred embodiments of the present invention comprise the O-aryl O-loweralkyl N-alkenyl phosphoroamido thioates wherein O-aryl is selected from monohalophenyl, polyhalophenyl and 4-loweralkyl-2-halophenyl.

I claim:

1. An O-aryl O-loweralkyl N-alkenyl phosphoroamidothioate corresponding to the formula

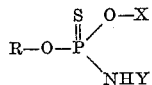

wherein R represents a member of the group consisting of halophenyl and 4-loweralkyl-2-halophenyl wherein the halogen in said halophenyl is selected from chlorine and bromine, X represents a loweralkyl radical and Y represents a member of the group consisting of allyl and methallyl.

2. O-(3,4-dichlorophenyl) O-methyl N-allyl phosphoroamidothioate.

3. O-(2,4,5-trichlorophenyl) O-methyl N-allyl phosphoroamidothioate.

4. O-(2-bromo-4-tertiarybutylphenyl) O-methyl N-allyl phosphoroamidothioate.

5. O-(4-chlorophenyl) O-ethyl N-allyl phosphoroamidothioate.

References Cited in the file of this patent

UNITED STATES PATENTS

| | | |
|---|---|---|
| 2,552,541 | Drake et al. | May 15, 1951 |

FOREIGN PATENTS

| | | |
|---|---|---|
| 662,024 | Great Britain | Nov. 28, 1951 |
| 814,152 | Germany | Sept. 20, 1951 |

OTHER REFERENCES

"The Van Nostrand Chemist's Dictionary," second printing (October 1953), D. Van Nostrand Co., Inc., New York, N. Y., page 44.